Dec. 6, 1960     R. K. POTTLE     2,963,204
CONTAINER HANDLE
Filed Nov. 14, 1958

INVENTOR.
RALPH KENNICOT POTTLE
BY George D. Ziehmer Jr.

AGENT

United States Patent Office 2,963,204
Patented Dec. 6, 1960

2,963,204

CONTAINER HANDLE

Ralph Kennicott Pottle, Georgetown, Conn., assignor to American Can Company, New York, N.Y., a corporation of New Jersey Filed Nov. 14, 1958, Ser. No. 773,850

4 Claims. (Cl. 222—465)

The present invention relates to container carrying handles and more particularly to a handle which can be permanently secured to the nozzle of a container after the nozzle and container have been assembled.

Recently, containers provided with plastic pouring nozzles have become very popular for liquid products such as detergents and the like. The smaller sizes of such containers can be easily manipulated by the housewife to pour the required amount of conents. However, when the larger sized containers are used, the weight of the filled container and its increased diameter make it difficult for the housewife to handle. In such cases it is desirable that a handle be provided which can be used by the consumer in lifting and carrying the container and also to assist in pouring out its contents.

Heretofore, container handles have been provided which are soldered or welded to the container. However, the soldering or welding operation requires the application of heat to the contaner surfaces, and such heat frequently disturbs the container lining and renders the interior surfaces of the container susceptible to corrosive attack by its contents. Other types of handles have been provided which are clamped onto the end seam of the container, but these are objectionable because they protrude beyond the normal contour of the containers.

The present invention eliminates these objectionable features by providing a handle which is secured to the container nozzle rather than to the container itself. In its preferred form, the ends of the handle are mounted in a mounting member or anchor ring which is formed with an internal upright flange which fits around the plastic nozzle and engages beneath a shoulder formed in the nozzle near its base. The upper end of this flange is preferably provided with serrations which embed themselves in the plastic nozzle material, thus preventing relative rotation between the handle and the nozzle. Thus the invention provides a handle construction which requires only a simple press-fit operation to permanently secure it to the container.

An object of the invention therefore is the provision of a carrying handle which may be secured to a completed container without adversely affecting the quality of the container.

Another object is the provision of a handle which may be swung into position against the top end of a container so that it will not project from the normal contour of the container during shipment and storage.

Numerous other objects and advantages of the invention will be apparent as it is better understood from the following description, which, taken in connection with the accompanying drawings, discloses a preferred embodiment thereof.

Referring to the drawings.

Figure 1:
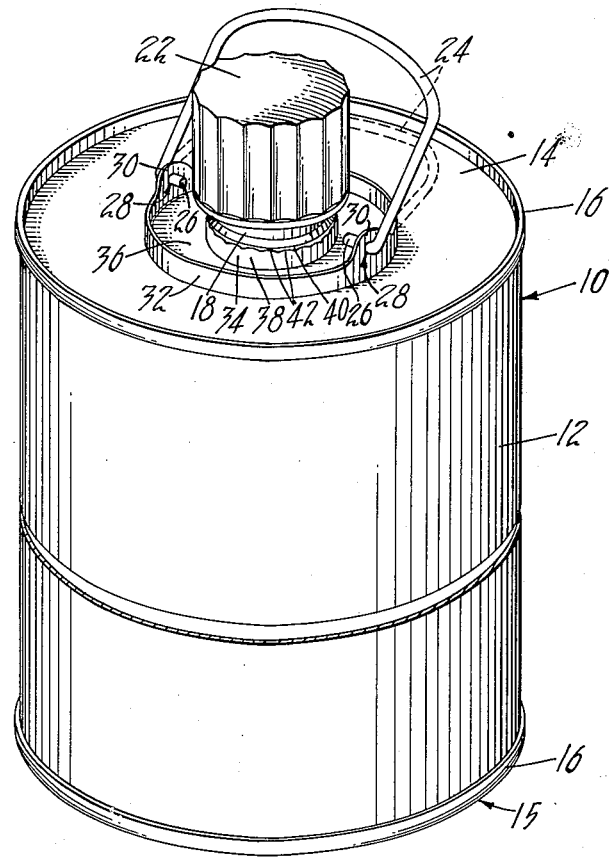
Figure 1 illustrates in perspective a container embodying the handle of the present invention.

The drawings illustrate a metal container 10 which comprises a cylindrical body 12 having its ends closed by an upper end member 14 and a lower end member 15 which are secured to the body in conventional double seams 16. A nozzle 18, preferably formed of suitable plastic material such as polyethylene, is secured in position at the center of the upper end member 14 in order to permit dispensing of the container contents.

The nozzle 18 may be secured to the end member 14 in any desirable manner. In the disclosure of the drawings, the upper end member 14 is formed with a circular central opening and the metal defining this opening is bent upwardly to form an annular flange 20 which is disposed in a shallow annular groove 21, formed in the nozzle 18 adjacent its bottom end, to securely hold the nozzle in position. The upper end of the nozzle 18 preferably is threaded and is sealed by means of a threaded cap 22 which is preferably formed of a rigid plastic such as polystyrene or the like.

In order to facilitate carrying of the container and pouring of the contents therefrom, a U-shaped wire handle or bail 24 is provided. The ends 26 of the handle 24 are preferably bent inwardly and passed through oppositely disposed holes 28 which are formed in ears 30 which form integral extensions of an outer annular upright flange or wall 32 of an anchor ring 34 which is utilized to secure the handle to the container nozzle. The anchor ring 34 also includes a flat annular body panel 36 which merges into an inner upright flange wall or collar 38, the upper end of which engages beneath a shoulder formed by the lower edge of an outwardly projecting preformed nozzle bead 40 spaced above the groove 21 of the nozzle 18. Since the bead 40 is of greater diameter than the upper end of the collar 38, the ring is thus locked onto the nozzle and the handle is securely held in place on the container. The upper edge of the collar 38 is preferably formed with a plurality of scallops or serrations 42 which embed themselves in the relatively soft plastic material of the shoulder 39 and effectively prevent rotation of the anchor ring 34 relative to the nozzle 18.

The handle 24 is easily assembled on the container by merely positioning the anchor ring 34 over the nozzle 18 and pressing downwardly so that the collar 38 snaps over the bead 40 and into nozzle engaging position thereneath. In order to facilitate this snapping action, the bead 40 is preferably formed with an inclined upper surface 44 which serves to centralize and guide the anchor ring 34 as it is pressed into position on the nozzle.

Figure 2:
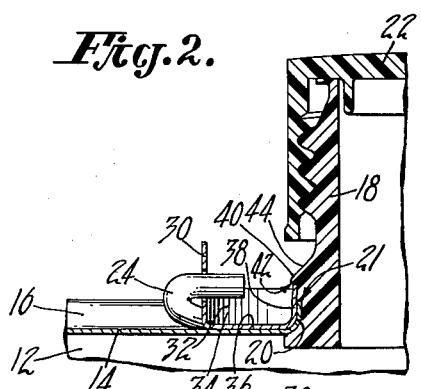
Fig. 2 is an enlarged fragmentary view in vertical section taken radially through the upper central portion of the container of Fig. 1; and showing how the handle is secured to the plastic nozzle of the container.
Figure 3:
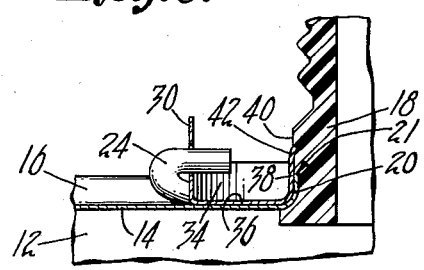
Fig. 3 is a sectional view similar to Fig. 2 showing a modified form of the connection between the handle and the plastic nozzle.
Figure 4:
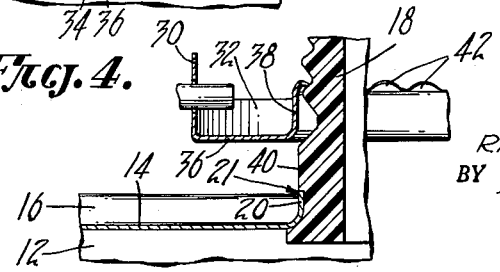
Fig. 4 is a sectional view similar to Fig. 3, and showing the various parts prior to the time the handle unit is pressed into final position on the nozzle.

When not in use, the handle or bail 24 is swung downwardly into engagement with the upper end member 14 inwardly of the end seam 16, as seen in full lines in Figs. 2, 3, and 4 and in dotted lines in Fig. 1. In this position, it is completely out of the way for all practical purposes and does not interfere with the packing of the cans for shipment and storage.

In the modified form disclosed in Figs. 3 and 4 the nozzle 18 is not formed with a projecting locking shoulder or bead. Instead, the upper scalloped or serrated edge portion 42 of the anchor ring flange 38 is inclined radially inwardly so that its diameter is less than the outside diameter of the cylindrical base portion of the nozzle 18. Thus, when the anchor ring 34 is pressed downwardly into the position of Fig. 3, the scallops 30 embed themselves in the deformable plastic nozzle and permanently secure the handle in place. This condition is made possible by the cold flow characteristics of the plastic material from which the nozzle is made. It will be obvious that other variations are possible in the structure utilized to secure the anchor ring to the spout.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A container having an upstanding pouring nozzle of deformable plastic material secured to the top wall thereof, a U-shaped carrying handle for said container, and an annular channel shaped anchor member for mounting said handle, said anchor member having an inner upstanding peripheral wall embedded at its upper end in the plastic material of said nozzle to permanently secure said anchor member to said nozzle, said member also having an outer upstanding peripheral wall provided with diametrically opposed ears for securing opposite ends of said handle thereto.

2. A container having an upstanding pouring nozzle of deformable plastic material secured to the top end thereof, said nozzle having an outwardly extending peripheral bead thereon, a U-shaped carrying handle for said container, and an annular channel shaped anchor member for mounting said carrying handle, said anchor member having an inner upstanding cylindrical wall embedded at its upper end in the plastic nozzle material beneath said bead for permanently securing said anchor member to the nozzle, said anchor member further having an outer upstanding cylindrical wall provided with diametrically opposed ears for securing opposite ends of said U-shaped handle thereto.

3. The container of claim 1 wherein the upper edge of said anchor member inner wall is provided with inwardly extending serrations permanently engaging said nozzle to prevent relative rotation of said anchor member and nozzle.

4. The container of claim 3 wherein the inner upstanding peripheral wall of said anchor member is cylindrical and of less diameter than said nozzle, said wall being inclined radially inwardly to facilitate embedding of said serrations in the plastic materials of the nozzle when the anchor member is pressed downwardly over the nozzle into its final permanently secured position.

References Cited in the file of this patent

UNITED STATES PATENTS

| | | |
|---|---|---|
| 2,160,662 | Jenkins | May 30, 1939 |
| 2,805,006 | Henchert | Sept. 3, 1957 |

FOREIGN PATENTS

| | | |
|---|---|---|
| 839,283 | France | Mar. 30, 1939 |